United States Patent
Baube et al.

(10) Patent No.: US 12,318,917 B2
(45) Date of Patent: Jun. 3, 2025

(54) END OF ARM TOOL WITH PROGRAMMABLE PITCH

(71) Applicant: InTunes Products, LLC, Webster, NY (US)

(72) Inventors: Scott H. Baube, Honeoye, NY (US); Greggory Bartoo, Webster, NY (US)

(73) Assignee: InTunes Products, LLC

( * ) Notice: Subject to any disclaimer, the term of this patent is extended or adjusted under 35 U.S.C. 154(b) by 818 days.

(21) Appl. No.: 17/553,278

(22) Filed: Dec. 16, 2021

(65) Prior Publication Data

US 2022/0184819 A1 Jun. 16, 2022

Related U.S. Application Data

(60) Provisional application No. 63/224,678, filed on Jul. 22, 2021, provisional application No. 63/126,275, filed on Dec. 16, 2020.

(51) Int. Cl.
B25J 15/06 (2006.01)
B25J 15/00 (2006.01)

(52) U.S. Cl.
CPC ....... B25J 15/0616 (2013.01); B25J 15/0052 (2013.01)

(58) Field of Classification Search
CPC B25J 15/0616; B25J 15/0052; B25J 15/0061; B25J 9/123
See application file for complete search history.

(56) References Cited

U.S. PATENT DOCUMENTS

| | | | |
|---|---|---|---|
| 6,513,233 B1 | 2/2003 | Nakao et al. | |
| 6,585,476 B1 | 7/2003 | Yi | |
| 7,017,261 B2 | 3/2006 | Okamoto et al. | |
| 7,578,054 B2 | 8/2009 | Komiya et al. | |
| 9,611,102 B2 | 4/2017 | Job et al. | |
| 9,623,569 B2* | 4/2017 | McCollum | B65G 67/24 |
| 9,701,487 B2 | 7/2017 | Unterseher | |
| 9,808,933 B2 | 11/2017 | Lin et al. | |
| 10,011,022 B1* | 7/2018 | Lin | B25J 15/0061 |
| 10,020,767 B2 | 7/2018 | Yamanaka et al. | |
| 10,406,561 B2* | 9/2019 | Carpenter | B07C 3/02 |
| 2009/0193642 A1* | 8/2009 | Lin | B25J 15/0052 29/428 |

(Continued)

FOREIGN PATENT DOCUMENTS

| | | |
|---|---|---|
| EP | 2756934 | 7/2014 |
| FR | 3088842 | 5/2020 |

(Continued)

OTHER PUBLICATIONS

"Syntegon Processing and Pacakging" (Accessed Aug. 6, 2020).
"Cartesian Robots Are a Simpler, Lower-Cost Alternative to SCARA and Six-Axis Robots." (Accessed Aug. 6, 2020).

*Primary Examiner* — Stephen A Vu
(74) *Attorney, Agent, or Firm* — Woods Oviatt Gilman LLP; Katherine H. McGuire, Esq.

(57) ABSTRACT

A computer programmable end of robot arm tool for picking and placing a plurality of objects arranged in a first array from a first pick location to a second place location where the objects are placed in a second array different from said first array where the spacing between the picking arms is programmable between different spacing arrangements including during the pick and place arm movement.

4 Claims, 18 Drawing Sheets

(56) References Cited

U.S. PATENT DOCUMENTS

| | | | |
|---|---|---|---|
| 2014/0119875 A1* | 5/2014 | Job | B65G 47/71 414/800 |
| 2017/0203865 A1 | 7/2017 | Kalany et al. | |
| 2018/0222042 A1 | 8/2018 | Prüssmeier et al. | |

FOREIGN PATENT DOCUMENTS

| | | |
|---|---|---|
| WO | 2019/121723 | 6/2019 |
| WO | 2019/166097 | 9/2019 |

* cited by examiner

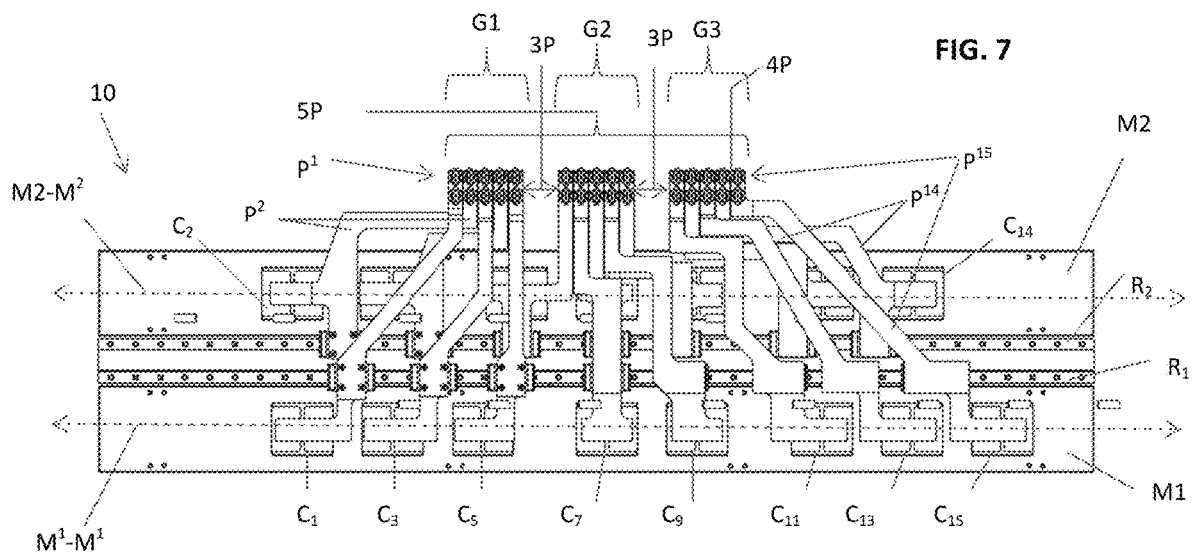
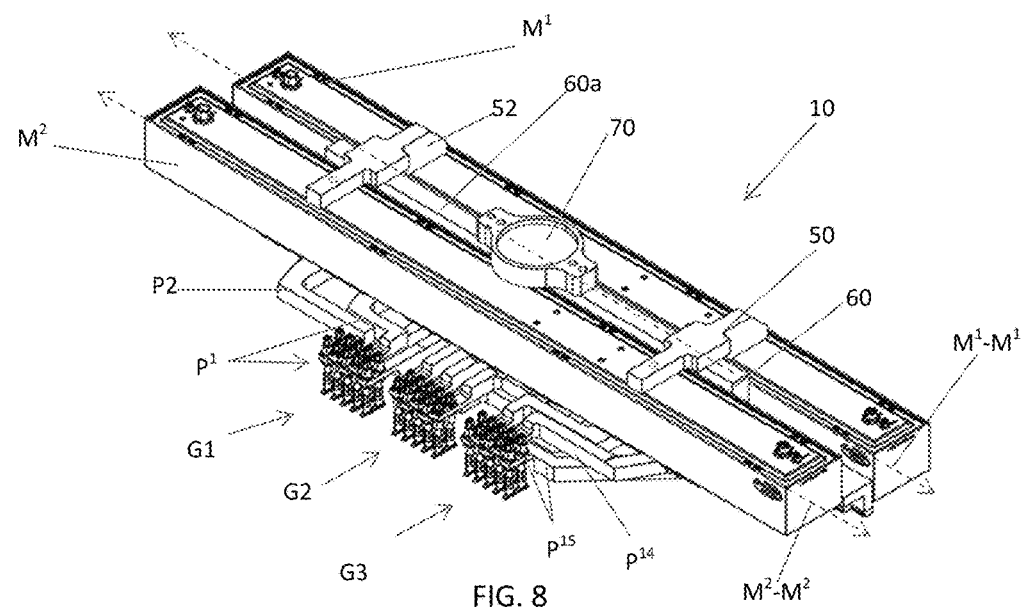

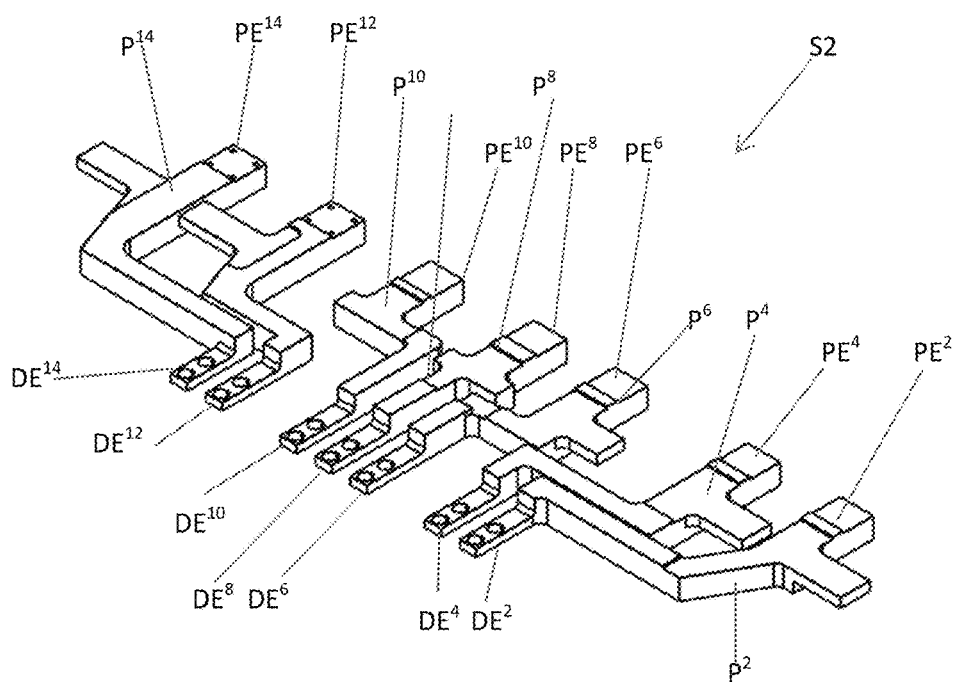
FIG. 15A
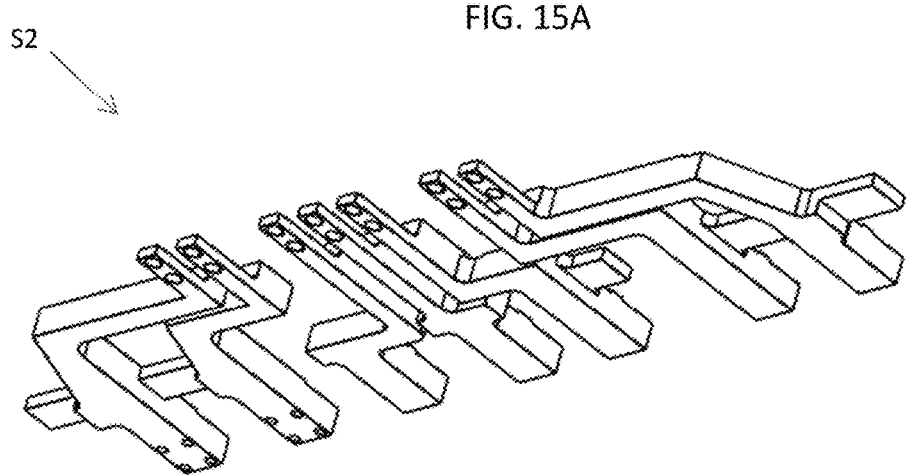
FIG. 15B
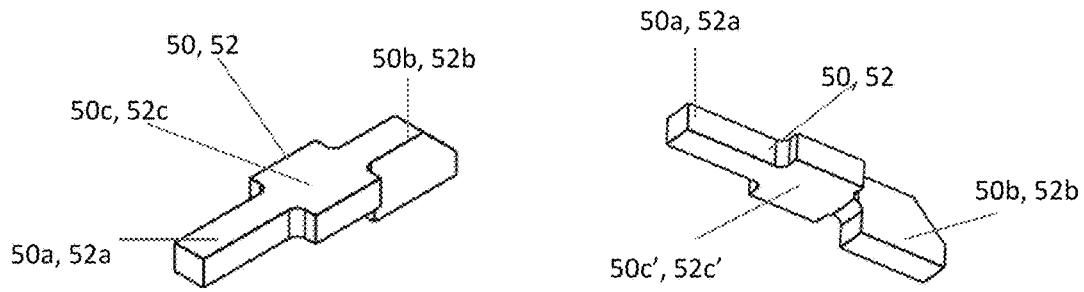
FIG. 16A
FIG. 16B

END OF ARM TOOL WITH PROGRAMMABLE PITCH

BACKGROUND OF THE INVENTION

This invention relates to package handling and more particularly relates to a programmable end of arm tool ("EOAT") for the movement of objects between locations.

SUMMARY OF THE INVENTION

The present invention provides an EOAT that is operable to provide a variety of different predetermined object spacing so as to enable a variety of package handling needs.

The EOAT may be mounted to a robotic arm of any desired type appropriate for the handling task such as a multi axis robot (e.g., 3, 4, 5, 6 or 7 axis) or a gantry/Cartesian type robot, for example.

The EOAT may also be mounted to a single or multi axis slide support without a robot being necessary.

The EOAT includes first and second electromagnetic linear motors each of which include a plurality of individual picking arm carriers that are movable along a respective electromagnetic linear motor in response to movement instructions received from one or more programmable control units such as a computer, for example. The movement instructions may be delivered to the electromagnetic linear motors from the control unit or units via hard wire connection or wireless connection, as desired.

The EOAT includes first and second groups or sets of picker arms associated with the first and second electromagnetic linear motors, respectively. The picker arms each have a proximal and distal end. Each of the first set of picker arms attach to and are movable with a respective picking arm carrier associated with the first electromagnetic linear motor. Each of the second set of picker arms attach to and are movable with a respective picking arm carrier associated with the second electromagnetic linear motor.

The distal ends of the first and second group of picker arms are each configured to receive one or more picker ends of any desired type such as vacuum or mechanical grippers, for example.

In a preferred embodiment, the first and second sets of picker arms are arranged in an alternating pattern with each set lying along a respective plane with the planes extending in spaced, parallel relation to each other. The spacing (or "pitch") between each adjacent picker arm may be varied by movement of the picker arm's respective motor carrier in accordance with the programming of the electromagnetic linear motors.

Additional objects, advantages and novel aspects of the present invention will be set forth in part in the description which follows, and will in part become apparent to those in the practice of the invention, when considered with the attached figures, wherein:

BRIEF DESCRIPTION OF THE DRAWINGS

FIG. 7 is the view of FIG. 5 with the picker arms in a third pitch position different than the first and second pitch positions;

FIG. 8 is a top perspective view of FIG. 7;

FIG. 15A is the view of FIG. 13A showing the second group of pitch arms;

FIG. 15B is a bottom perspective view of FIG. 15A;

FIG. 16A is a top perspective view of one of the linear motor mounting brackets seen in FIGS. 8 and 10-12;

FIG. 16B is a bottom perspective view of FIG. 16A;

DETAILED DESCRIPTION

Figure 1:
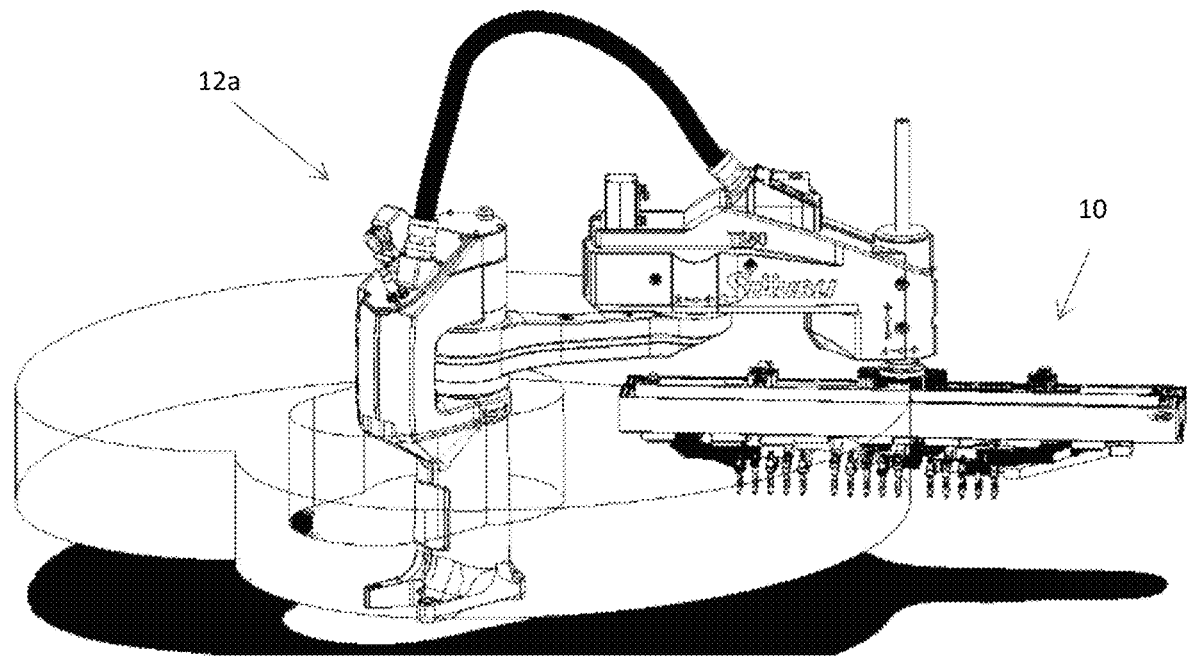
FIG. 1 is an embodiment of the EOAT shown mounted to a robotic arm.
Figure 2:
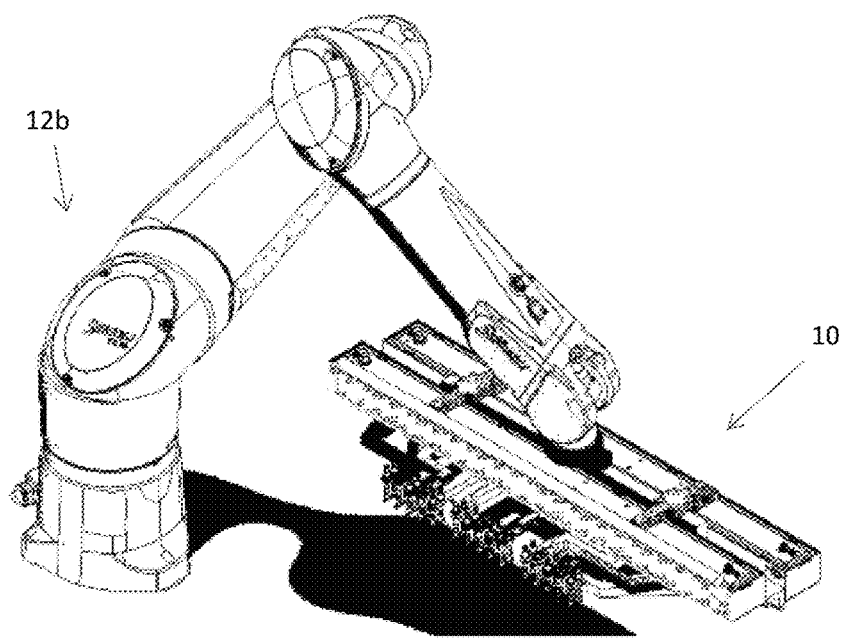
FIG. 2 is an embodiment of the EOAT shown mounted to another type of robotic arm.
Figure 3:
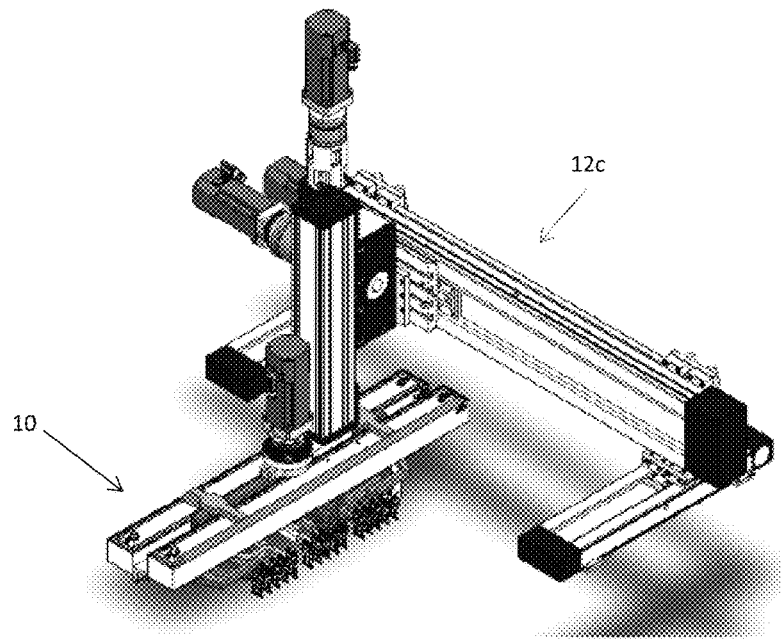
FIG. 3 is an embodiment of the EOAT shown mounted to another type of robotic arm.

Reference is now made to the drawing wherein similar reference characters refer to similar parts throughout the different views of the drawings. There is seen in FIGS. 1-4A-C an embodiment of the inventive end of arm tool or EOAT indicated generally by the reference numeral 10. EOAT is adapted for attachment to any desired material handling robot such as industrial robot 12*a* (a 4 axis robot), robot 12*b* (a six axis robot) and robot 12*c* (a cartesian robot), respectively. EOAT 10 is considered an industrial material handling machine which is operable to pick a plurality of objects "OB" from a first "pick" location 14*a* (FIG. 4A) and transfer (FIG. 4B) and deposit those objects at a second "place" location 14b (FIG. 4C).

The objects OB at the first pick location 14a are in a first spacial arrangement or first "pitch" which may be different than the spacial arrangement or second "pitch" required at the second object place location 14b.

In the particular embodiment shown in FIGS. 1-20B, the EOAT 10 is equipped with fifteen individual picking arms $P^1$-$P^{15}$ which are divided among two picking arm groups or sets $S^1$ and $S^2$ which attach to electromagnetic linear motors $M^1$ and $M^2$, respectively. The sets $S^1$ and $S^2$ are shown separately in FIGS. 14a, 14b and 15a, 15b, respectively, where the picking arms in set $S^1$ are seen to include $P^2$, $P^4$, $P^6$, $P^8$, $P^{10}$, $P^{12}$, $P^{14}$, and the picking arms in set $S^2$ are seen to include $P^1$, $P^3$, $P^5$, $P^7$, $P^9$, $P^{11}$, $P^{13}$ and $P^{15}$. When attached to respective motors $M^1$ and $M^2$, the picking arms in Set $S^1$ alternate with the picking arms in Set $S^2$. This alternating arrangement of two sets of picking arms which attach to two respective and separately driven motors $M^1$ and $M^2$ allows for more pitching possibilities than would otherwise be available with a single set of picking arms arranged in a single linear row. As such, the EOAT 10 has a very broad capability and is able to handle many more specific object handling requirements than prior art EOATs having only a single linear motor operating a single set of picking arms.

Figure 4A:
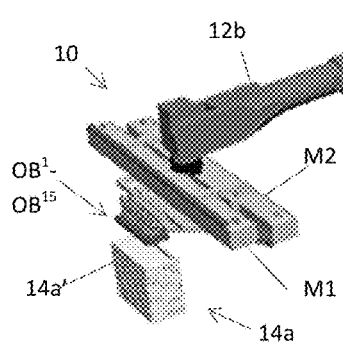
FIGS. 4A-4C are fragmented perspective views of an embodiment of the invention showing the EOAT picking, moving and placing objects, respectively.
Figure 4B:
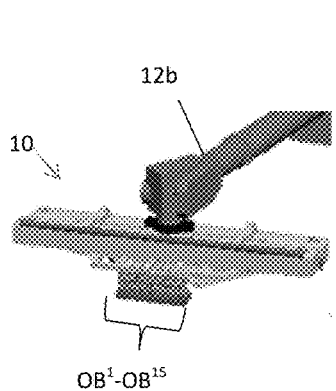
Figure 4C:
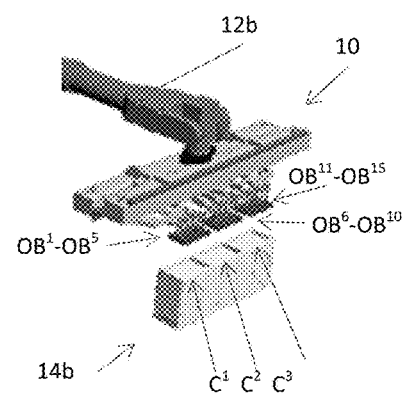
Figure 5:
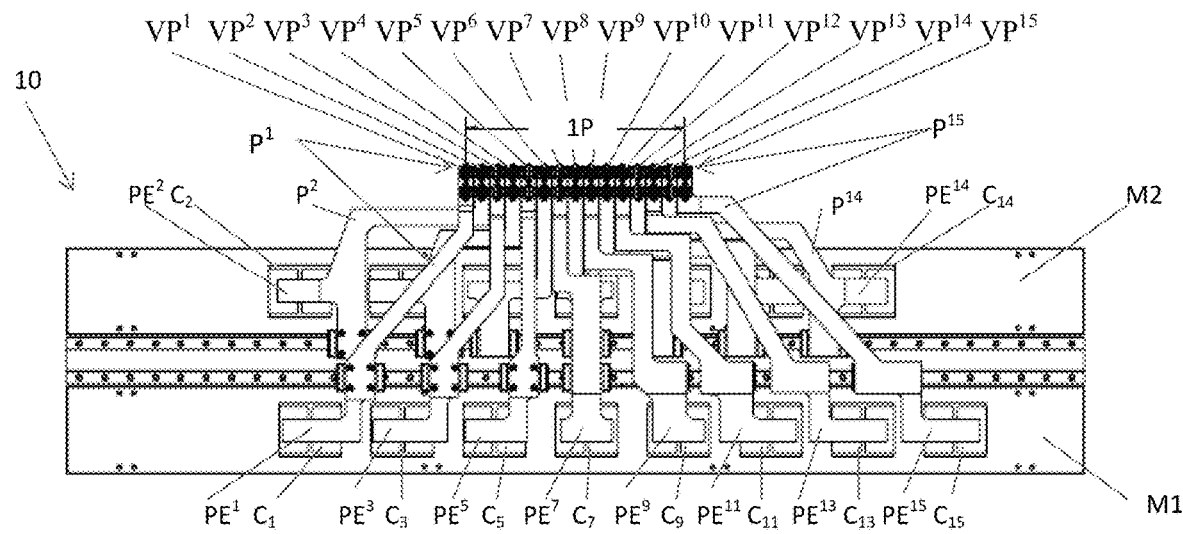
FIG. 5 is a bottom plan view of an EOAT according to one embodiment of the invention and with the picker arms in a first pitch position.
Figure 6:
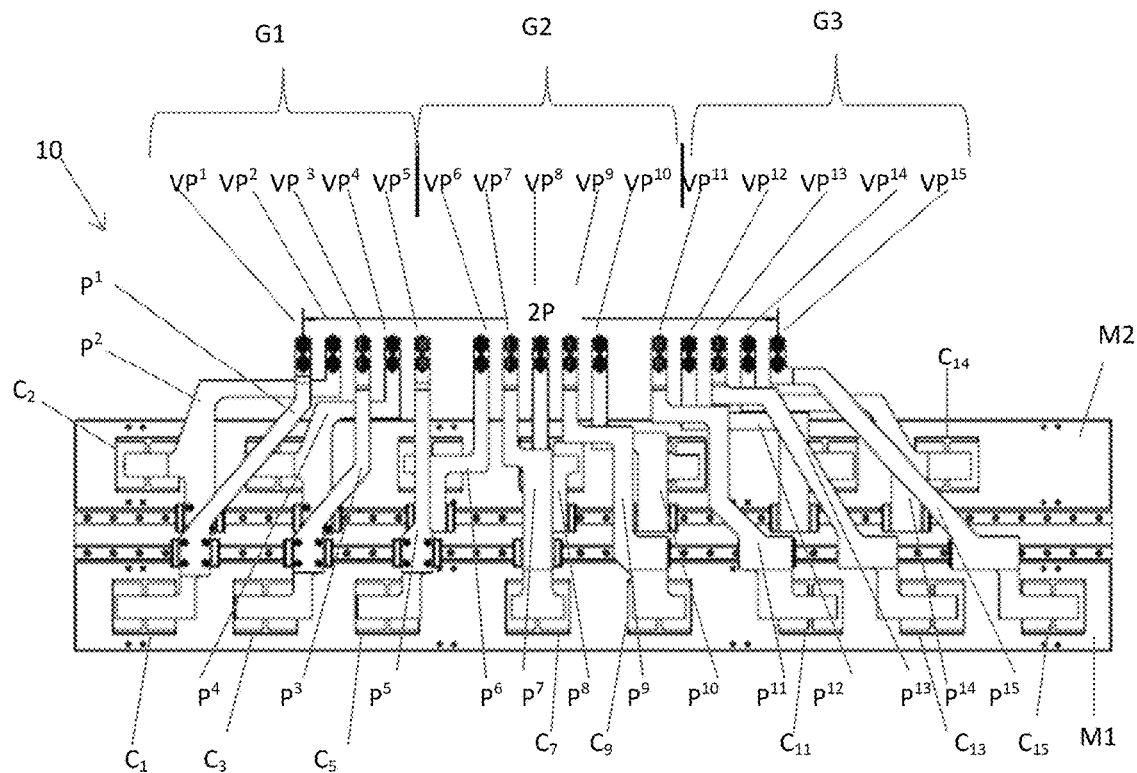
FIG. 6 is the view of FIG. 5 with the picker arms in a second pitch position.
Figure 9:
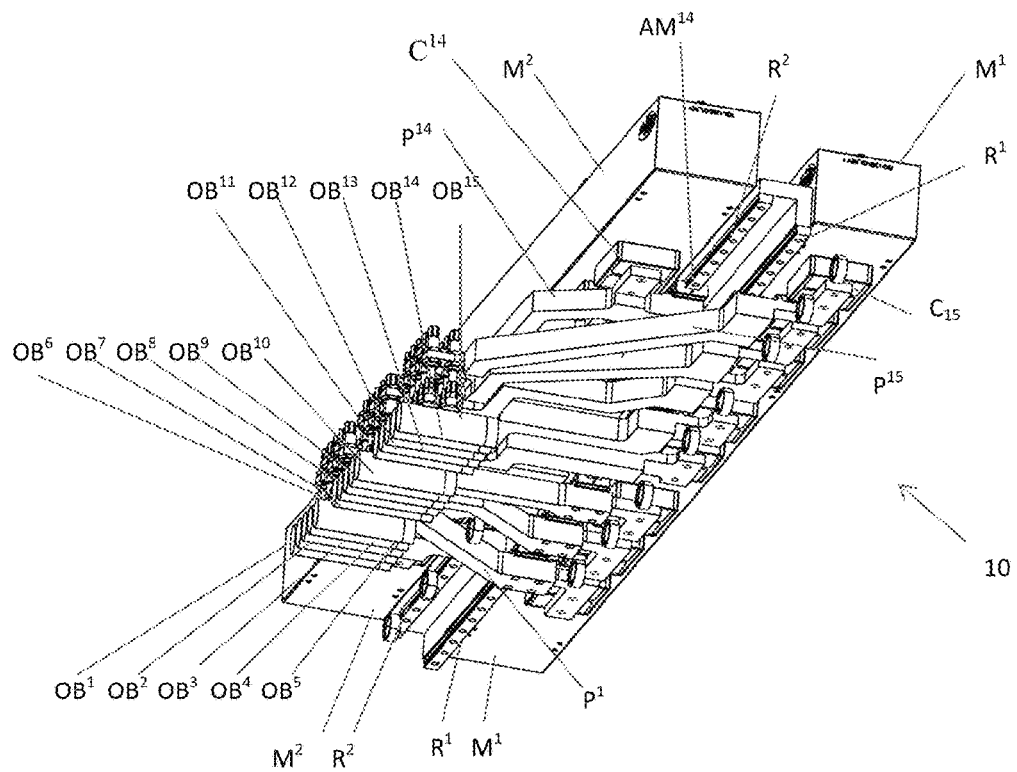
FIG. 9 is a bottom perspective view of FIG. 7.
Figure 10:
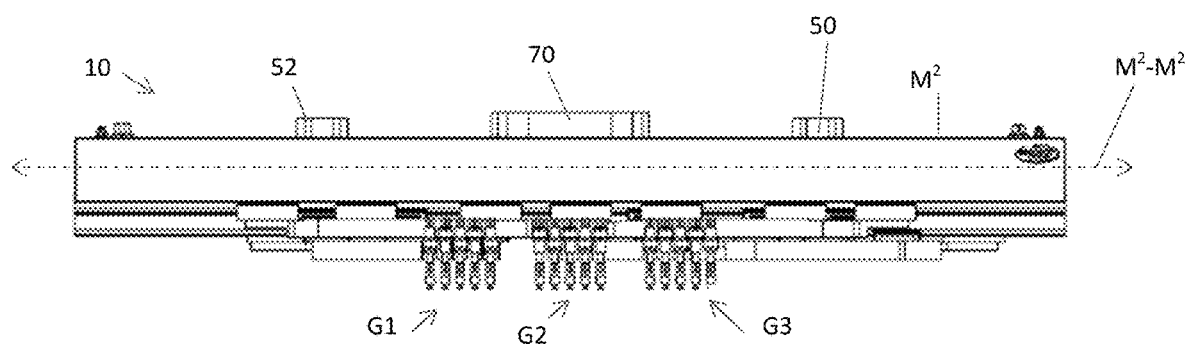
FIG. 10 is a front elevational view of FIG. 9.
Figure 14A:
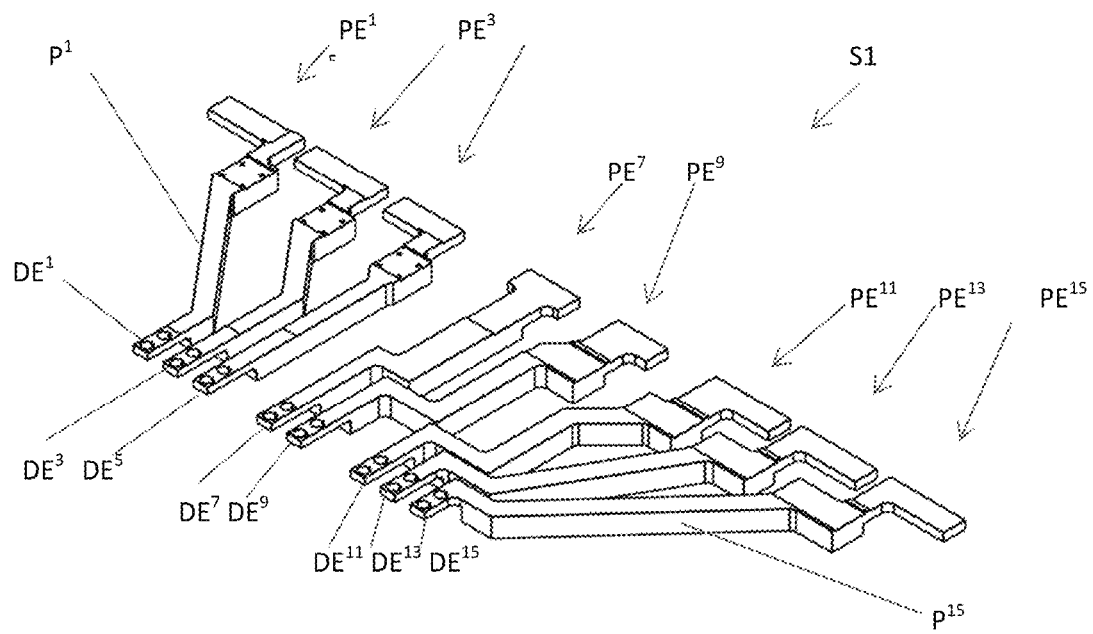
FIG. 14A is the view of FIG. 14A showing the first group of pitch arms.
Figure 14B:
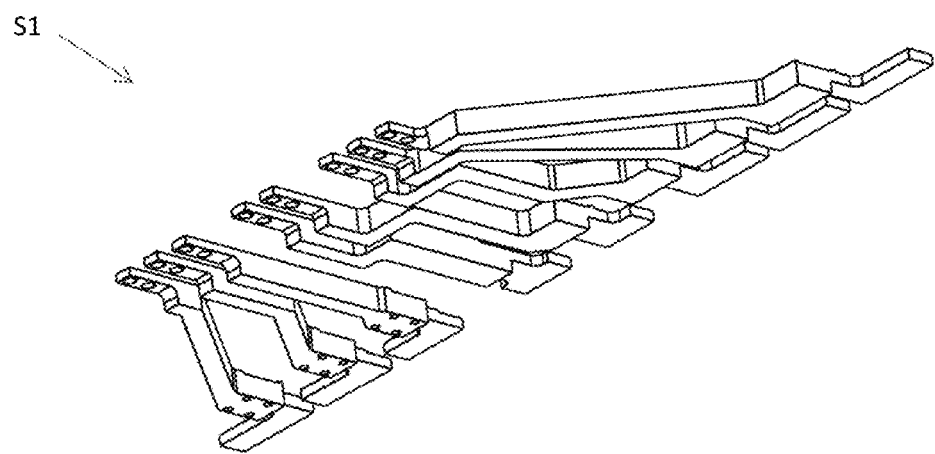
FIG. 14B is a bottom perspective view of FIG. 14A.

Each picking arm $P^1$-$P^5$ includes a respective proximal end $PE^1$-$PE^{15}$ and distal end $DE^1$-$DE^{15}$ (see FIGS. 5, 14A and 15A). One or more respective object pickers which may be in the form of vacuum pickers $VP^1$-$VP^{15}$ are mounted to a respective picker arm distal end $DE^1$-$DE^{15}$. The vacuum pickers $VP^1$-$VP^{15}$ are operable via respective vacuum lines (not shown) to pick and place fifteen discrete objects $OB^1$-$OB^{15}$, respectively (individual picked objects $OB^1$-$OB^{15}$ are seen best in FIG. 9). FIGS. 4, 5 and 6 show three different exemplary pitch spacings between the individual picking arms $PA^1$-$PA^{15}$, it being understood that other pitch spacings are possible depending on the parameters of the job (i.e., shape and size of objects being handled, orientation of the objects when they are presented to EOAT 10 and the required orientation of objects at the place location, for example).

Figure 18A:
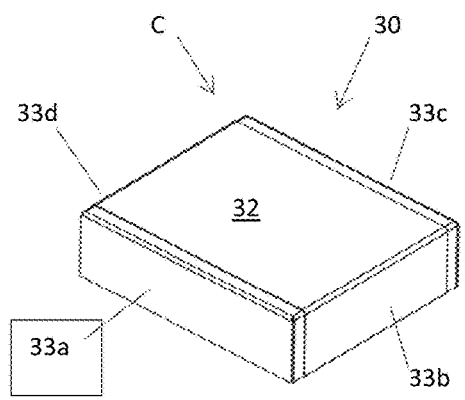
FIG. 18A is a top perspective view of one of the pitch arm linear motor carriers seen in FIGS. 5-7 and 9-12.
Figure 18B:
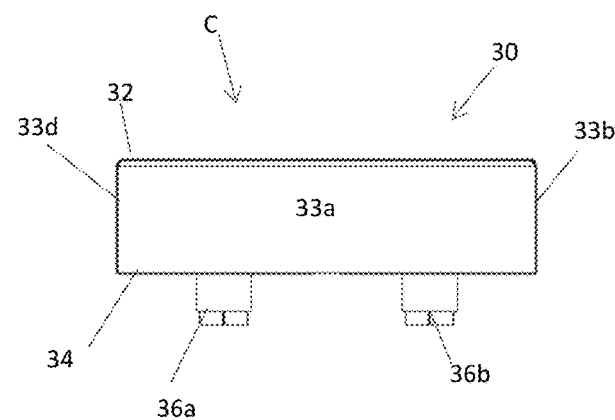
FIG. 18B is a side elevational view of FIG. 18A.

It is noted that in the embodiment shown and described herein, the objects being handled are elongated (e.g., the shape and size of a cigarette lighter) which are each individually picked and moved between locations by a picker arm having two vacuum pickers each (the second vacuum picker is designated by the same reference letter and numerals as the first vacuum picker on the same picking arm with an added prime symbol, as in $VP^{1'}$-$VP^{15'}$ (see FIGS. 18A and 18B). Thus, the number, size and arrangement of individual vacuum pickers on each picking arm may vary to suit the shape and size of the objects being handled.

Referring to FIGS. 4A-4C, the objects $OB^1$-$OB^{15}$ arrive at the pick location 14a (FIG. 4a) in a tray 14a' wherein the objects are arranged in a side by side fashion with each object lying in touching and/or closely spaced from an adjacent object (the object to object spacial relation is also referred to herein as "pitch"). The pitch of the objects at the pick location 14a is considered the first pitch "1P" (FIGS. 4A and 5). The picking arms $P^1$-$P^{15}$ are arranged in substantially the same pitch configuration "1P" so that a respective picking arm is aligned directly above a respective object $OB^1$-$OB^{15}$ when EOAT 10 is positioned above the tray 14a'. Once so aligned, the EOAT 10 is lowered and the vacuum picker(s) $VP^1$-$VP^{15}$ on the distal end of each picking arm is/are activated to pick a respective object $OB^1$-$OB^{15}$ via an applied suction force delivered through appropriate vacuum lines (not shown) connected to the vacuum pickers $VP^1$-$VP^{15}$.

It is noted that each pitch dimension may be measured with respect to any desired reference point(s) including, for example, the distance between the end picking arms $P^1$ and $P^{15}$, the distance between adjacent pickings arms, the distance between discrete groupings of picking arms, etc. In the exemplary embodiment shown and described herein, first pitch 1P is considered to be the distance between the picking arms $P^1$ and $P^{15}$ located at either end of the full array of picking arms where the picking arms are in touching or closely adjacent relationship as seen best in FIG. 5.

Once the objects are picked by the picking arms at pick location 14a, the robot 12 moves the EOAT 10 toward the object place location 14b. FIG. 4B shows the EOAT in an intermediate EOAT travel location between pick and place locations 14a and 14b, respectively.

The object place location 14b (FIG. 4C) may require the objects $OB^1$-$OB^{15}$ be spaced differently and/or in discrete groupings such as three groups G1, G2 and G3 of five objects each $OB^1$-$OB^5$, $OB^6$-$OB^{10}$ and $OB^{11}$-$OB^{15}$, respectively, where each object in a group G1, G2 and G3 is spaced from an adjacent object in the same group by a distance or third pitch "3P" (FIG. 7). For example, the object place location 14b (FIG. 4C) may have a three compartment $C^1$, $C^2$, $C^3$ tray which may form a part of the final object packaging (e.g., the object compartment or tray of a blister type package) with five objects in each of three single packages located in compartments $C^1$, $C^2$ and $C^3$, respectively. In this exemplary embodiment, the picking arms in each group are closely adjacent to each other by a pitch distance 4P and may or may not be touching (where pitch 4P may be considered zero if touching) as seen in FIGS. 4C, 7-10, 13A-13C, 13F, 13G and 19A and 19B).

As seen in FIG. 7, there are three different pitch dimensions indicated: pitch 3P (distance between adjacent groups G1 and G2, and between G2 and G3; pitch 4P (distance between adjacent picking arms in each group, in this case, close to or at zero when viewed in top plan view); and 5P, where 5P is the distance between the far right and left end picking arms $P^1$ and $P^{15}$.

It is noted that FIG. 6 shows another pitch configuration where the adjacent picking arms in each group G1, G2 and G3 are spaced further apart from each other than is seen in the other figures. This may be considered as an exemplary pitch configuration that may be required depending on the pitch configuration requirement at the object place location. Stated another way, the pitch configuration of the picking arms needs to align with the pitch configuration of the object receptacles at the object place location such that each picking arm aligns with its respective object place location which may be an object package receptacle, for example. The pitch configuration in FIG. 6 may instead be considered an intermediate pitch configuration of the picking arms as they are moved from the configuration seen in FIG. 5 to the configuration seen in FIG. 7.

As seen best in FIGS. 6-12, first and second set of picking arms S1 and S2 connect to respective electromagnetic linear motors M1 and M2 via respective electromagnetic motor carriers $C_1$-$C_{15}$. More particularly, the first set of picking arms S1 includes picking arms $P^1$, $P^3$, $P^5$, $P^7$, $P^9$, $P^{11}$, $P^{13}$ and $P^{15}$ each including a respective proximal end $PE^1$, $PE^3$, $PE^5$, $PE^7$, $PE^9$, $PE^{11}$, $PE^{13}$ and $PE^{15}$ which may attach to a respective motor carrier $C^1$, $C^3$, $C^5$, $C^7 C^9 C^{11}$, $C^{13}$ and $C^{15}$ on motor M1 (FIG. 5). In like fashion, the second set of picking arms S2 includes picking arms $P^2$, $P^4$, $P^6$, $P^8$, $P^{10}$, $P^{12}$ and $P^{14}$ each including a respective proximal end $PE^2$, $PE^4$, $PE^6$, $PE^8$, $PE^{10}$, $PE^{12}$ and $PE^{14}$ which may attach to a respective motor carrier $C^2$, $C^4$, $C^6$, $C^8$, $C^{10}$, $C^{12}$, $C^{14}$ on motor M2.

Electromagnetic linear motors $M^1$ and $M^2$ are each operable to control the movement of the individual carriers $C^1$-$C^{15}$ located in linear spaced relation thereon. Since the picking arms $P^1$-$P^{15}$ are each attached to a respective carrier $C^1$-$C^{15}$, movement of a carrier $C^1$-$C^{15}$ causes movement of the respective picking arm $P^1$-$P^{15}$ attached thereto. The carriers $C^1$-$C^{15}$ are individually moveable in a reciprocating manner along their respective linear motors $M^1$, $M^2$ to provide the desired pitch between the picking arms $P^1$-$P^{15}$ at one or more locations throughout the EOAT movement. The desired pitch at the pick location 14a and the place location 14b may be programmed according to the requirements of the particular job via a user interface (not shown) of the linear motor controller operably connected to the linear motors $M^1$ and $M^2$.

Figure 18C:
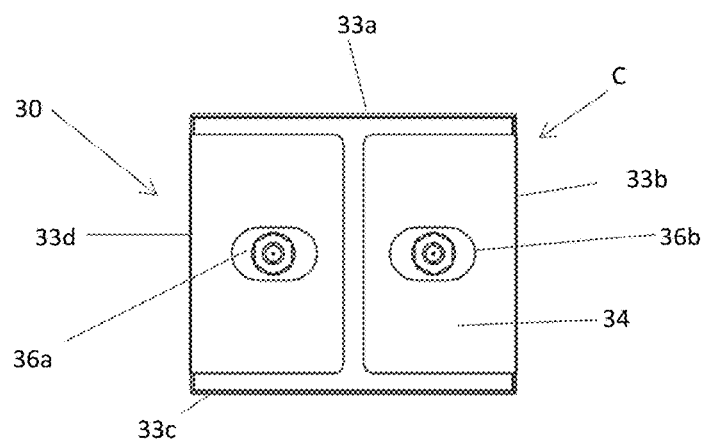
FIG. 18C is a bottom plan view thereof.

FIGS. 18A-18C show a representative carrier C having a housing 30 which may include a top surface 32, bottom surface 34 and four side surfaces 33a-33d, respectively. One or more securing elements 36a, 36b may extend from carrier bottom surface 34 to attach the carrier C to a respective picking arm $P^1$-$P^{15}$. Securing elements 36a, 36b may be of any desired type such as the pin and nut configuration shown in FIGS. 18A-18C, for example.

Each of the picking arms $P^1$-$P^{15}$ may also attach to a respective picking arm mount $AM^1$-$AM^{15}$ with each picking arm mount $AM^1$-$AM^{15}$ attached to one of the first and second rails $R^1$ and $R^2$ associated with motors $M^1$ and $M^2$, respectively.

Figure 17A:
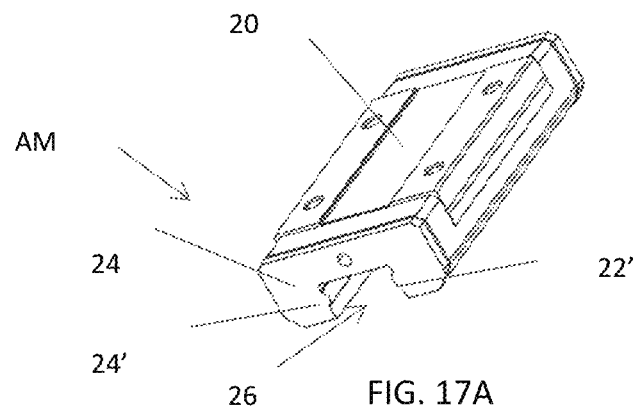
FIG. 17A is a top perspective view of one of the arm mounts seen in FIGS. 11 and 12.
Figure 17B:
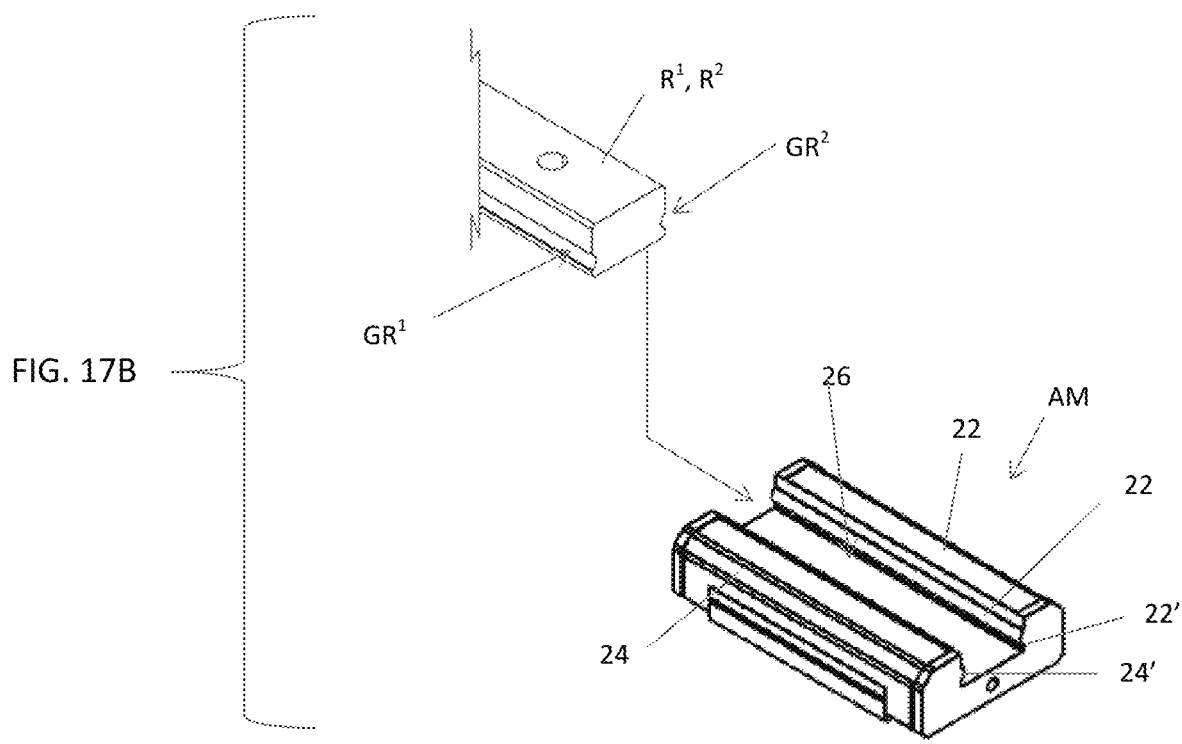
FIG. 17B is a bottom perspective view of FIG. 17A and further including a fragmented perspective view of one end of a rail to which the arm mount attaches.

FIGS. 17A and 17B illustrate a representative arm mount AM. The arm mount AM is seen to include an outwardly facing arm mounting surface 20 to which a respective picking arm $P^1$-$P^{15}$ may attach. For example, each picking arm $P^1$-$P^{15}$ may include an area $A^1$-$A^{15}$ located adjacent a respective proximal end $PE^1$-$PE^{15}$ against which the arm mounting surface 20 of a respective arm mount $AM^1$-$AM^{15}$ may locate and be secured via appropriate securing means or elements (e.g., screw and/or adhesive and/or mechanical interference fit, etc.).

Arm mount AM may further include first and second spaced legs 22, 24 defining a channel 26 therebetween. Channel 22 may include a cross section geometry allowing for a mating, sliding fit with a respective rail $R^1$ and $R^2$. For example, legs 22 and 24 may include opposing flanges 22' and 24', respectively, each of which extend into and define part of the cross sectional geometry of channel 26. The opposing flanges 22' and 24' may align and fit within respective grooves $GR^1$ and $GR^2$ formed in each rail $R^1$ and $R^2$ as seen best in FIGS. 9, 11, 12, 17A and 17B.

Rails $R^1$ and $R^2$ are mounted to respective surfaces 40a and 40b of an elongated right angle mount member 40. As seen best in FIGS. 8-12, one or more brackets 50 and 52 attach to and connect the electromagnetic linear motors $M^1$ and $M^2$. The first and second brackets 50 and 52, respectively, each include respective first and second end portions 50a, 50b and 52a, 52b, respectively, with the second end portions 50b, 52b having a larger height "$H^2$" than the height $H^1$ of the first end portions 50a, 52a. As such, the motors $M^1$ and $M^2$ are positioned so that motor $M^1$ extends along a longitudinal axis $M^1$-$M^1$ which lies in spaced, parallel relationship to and below the longitudinal axis $M^2$-$M^2$ along which motor $M^2$ lies (when viewing the EOAT 10 in the orientation seen in FIGS. 11 and 12).

Figure 11:
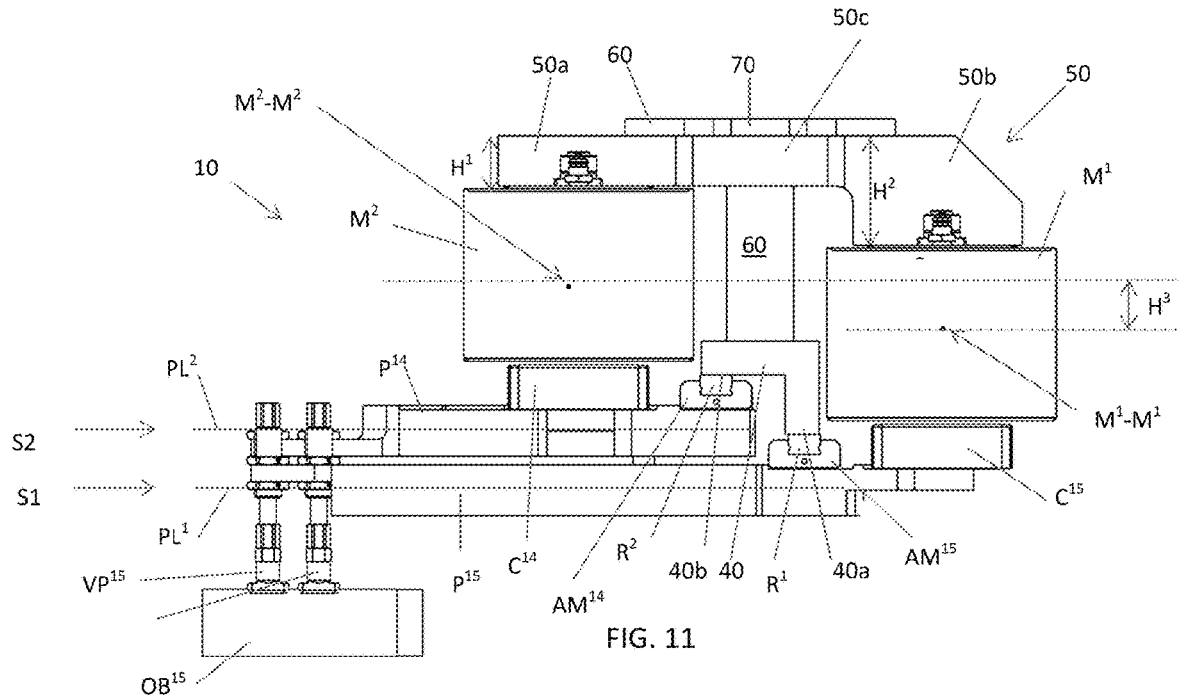
FIG. 11 is a right side elevational view of FIG. 10.
Figure 12:
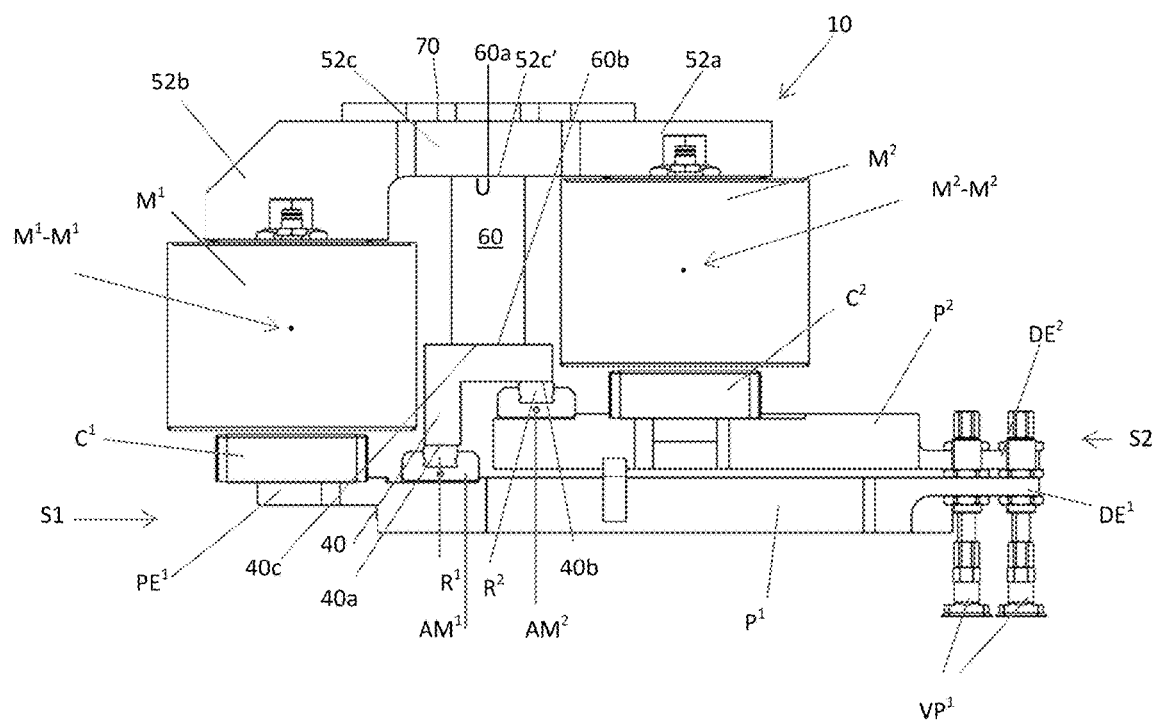
FIG. 12 is a left side elevational view of FIG. 10.
Figure 13A:
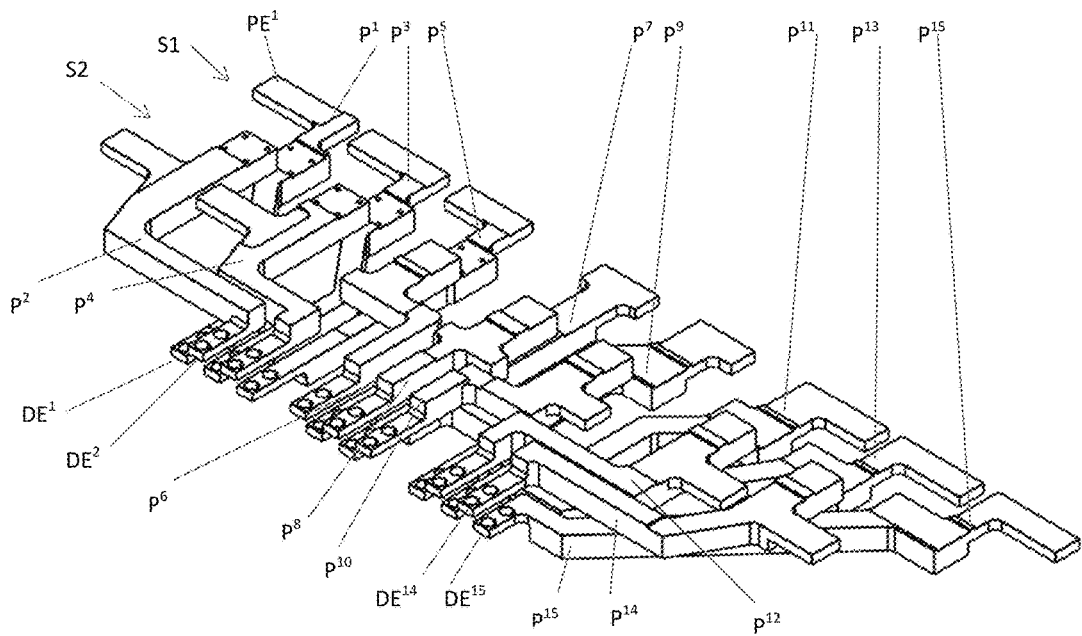
FIG. 13A is a top perspective view of the first and second groups of picker arms arranged in the pitch position seen in FIGS. 7-10.
Figure 13B:
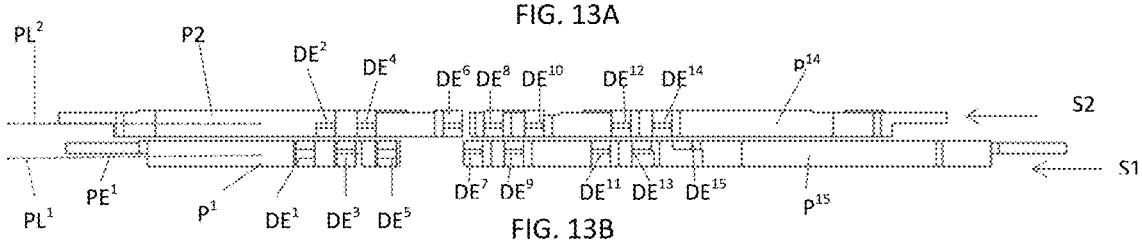
FIG. 13B is front elevational view of FIG. 13A.
Figure 13C:
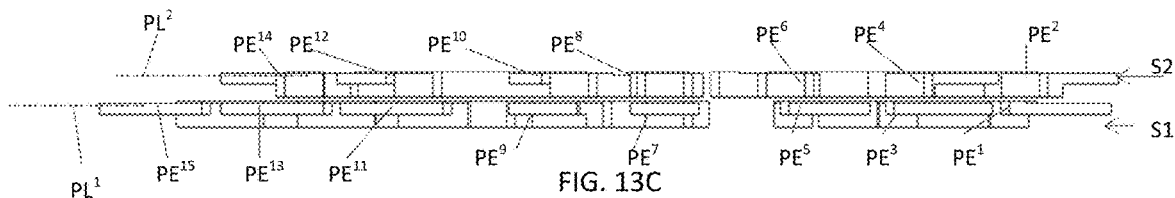
FIG. 13C is a rear elevational view of FIG. 13A.
Figure 13D:
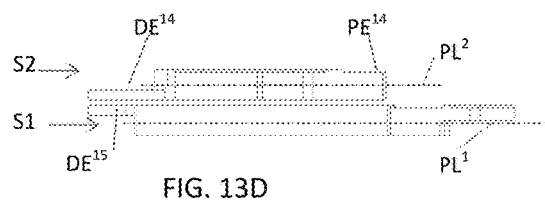
FIG. 13D is a right side elevational view of FIG. 13A.
Figure 13E:
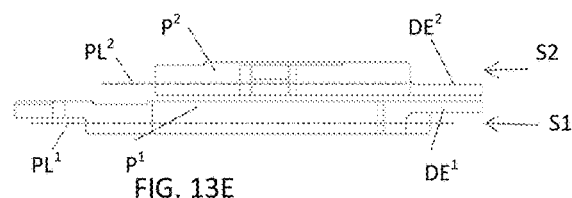
FIG. 13E is a left side elevational view of FIG. 13A.
Figure 13F:
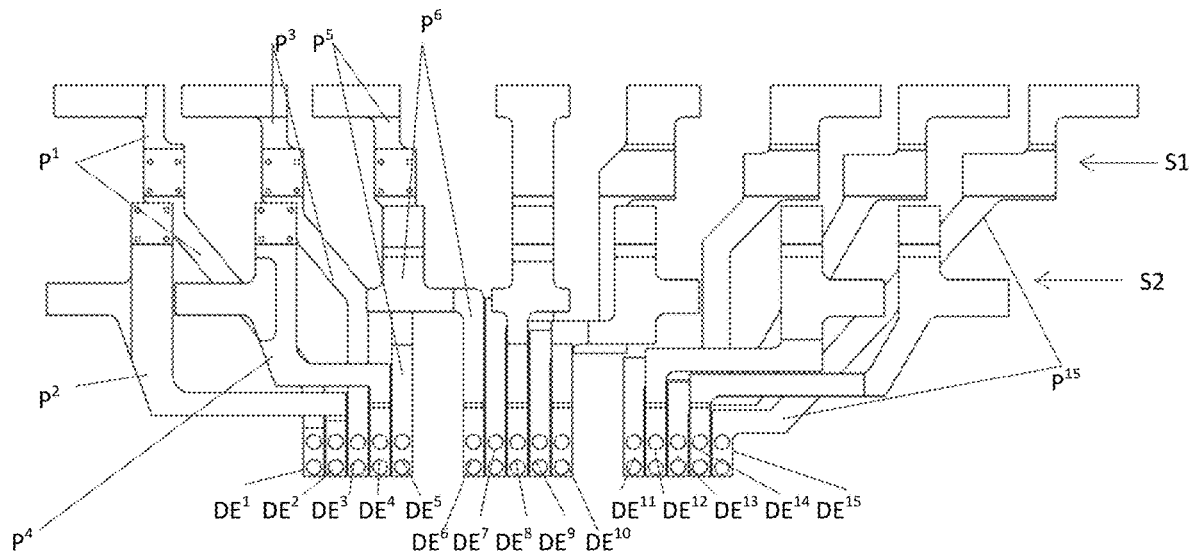
FIG. 13F is a top plan view of FIG. 13A.
Figure 13G:
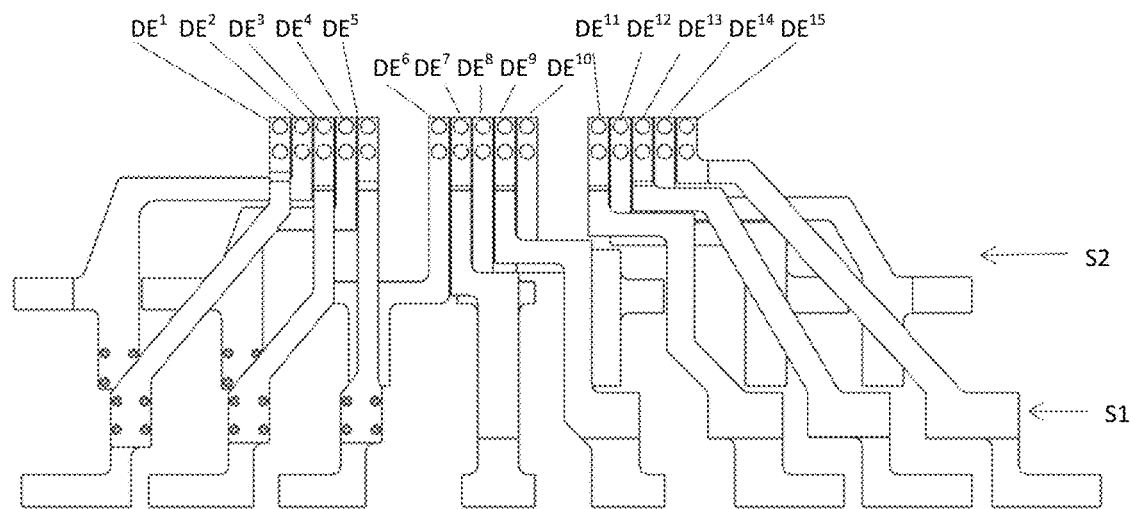
FIG. 13G is a bottom plan view of FIG. 13A.

Referring to FIG. 11, the vertical distance between axes $M^1$-$M^1$ and $M^2$-$M^2$ is indicated by height $H^3$. This "stepped" relation between the motors $M^1$ and $M^2$ positions the first and second sets $S^1$ and $S^2$ of the picking arms in the same stepped relation with picking arm set $S^1$ lying in a plane $PL^1$ which lies in spaced, parallel relation to the plane $PL^2$ of second set $S^2$. This spacing of the planes $P^1$ and $P^2$ between two different sets $S^1$ and $S^2$ of the picking arms allows for more picking arm pitch options and a smaller EOAT 10 than would otherwise be possible with a single set of picking arms on a single linear motor.

Figure 19:
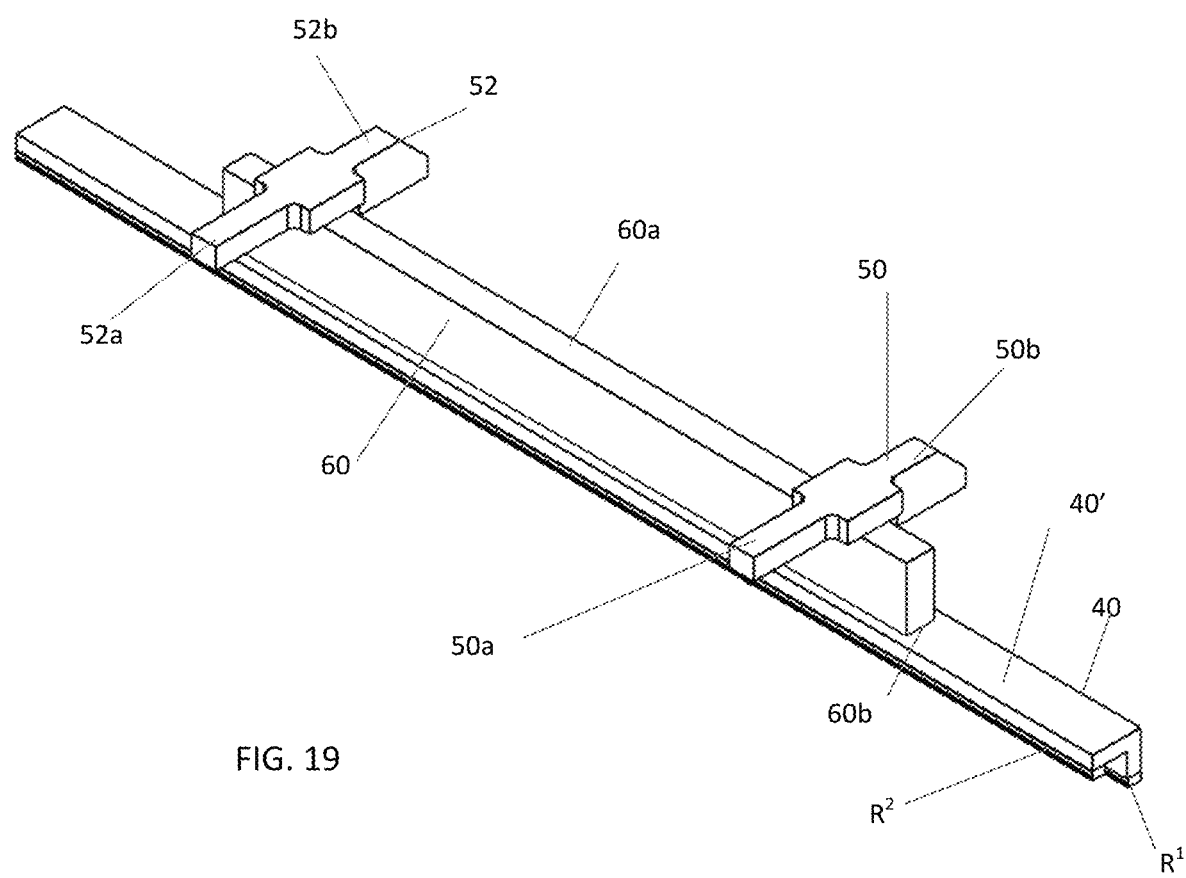
FIG. 19 is a perspective view of the right angle beam, which carry the first and second picking arm rails, connected to the center beam and first and second brackets.
Figure 20A:
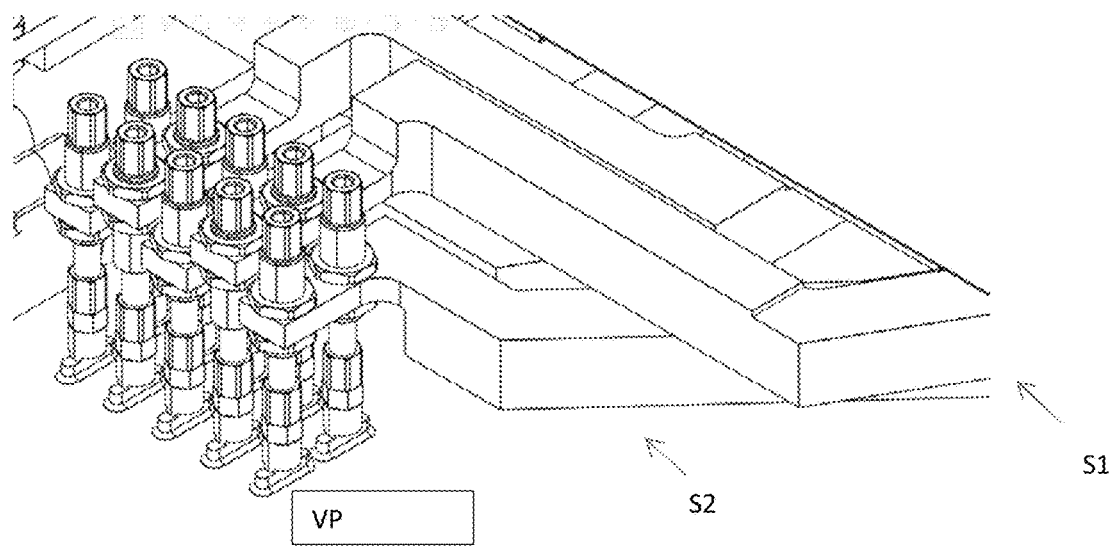
FIG. 20A is an enlarged, fragmented view of the group of five pitch arms with respective vacuum picker ends seen to the right in FIG. 8.
Figure 20B:
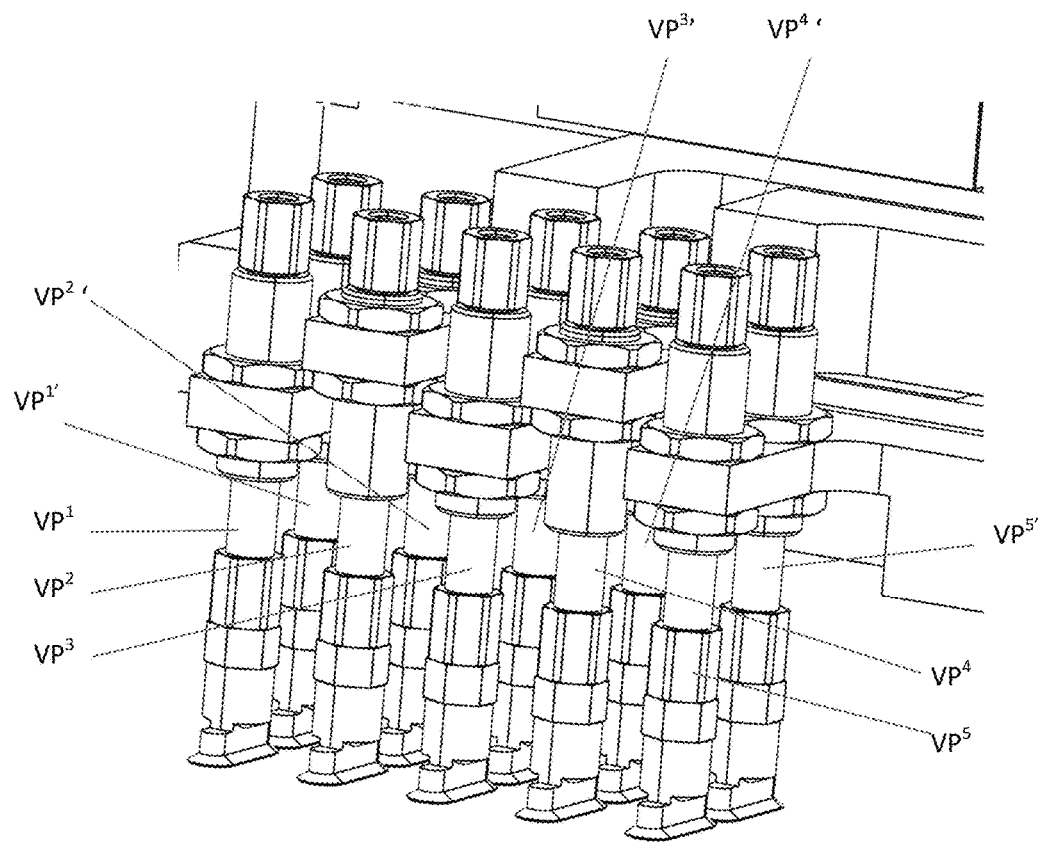
FIG. 20B is an enlarged, fragmented view of FIG. 20A to show yet further detail of the pitch arms and vacuum picker ends.
Figure 21A:
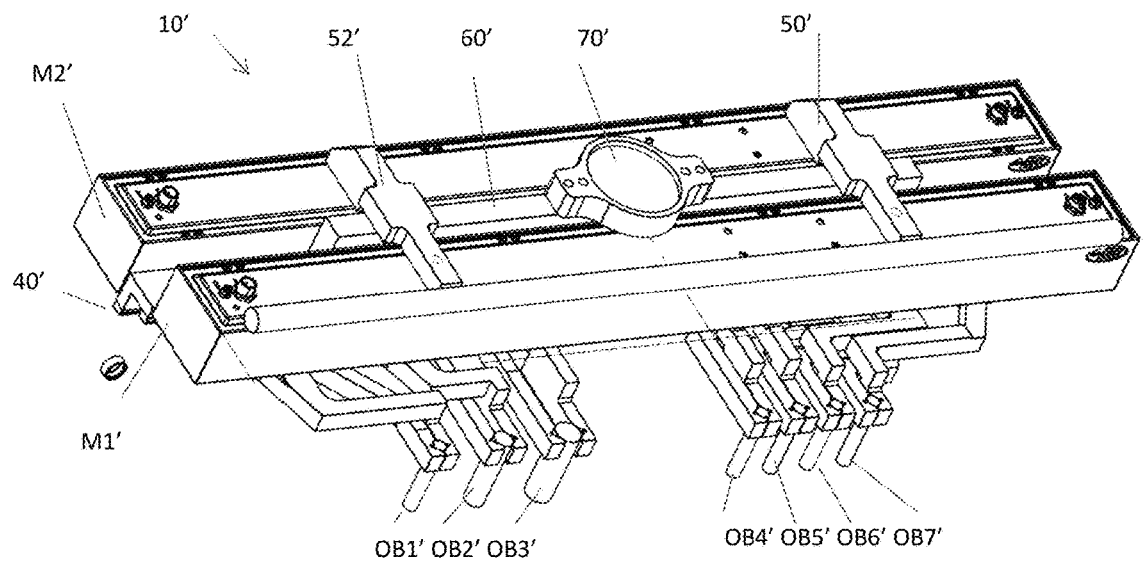
FIGS. 21A-H are left perspective, right perspective, front elevation, rear elevation, top plan and bottom plan, left end elevation, and right end elevation, respectively, showing another embodiment.
Figure 21B:
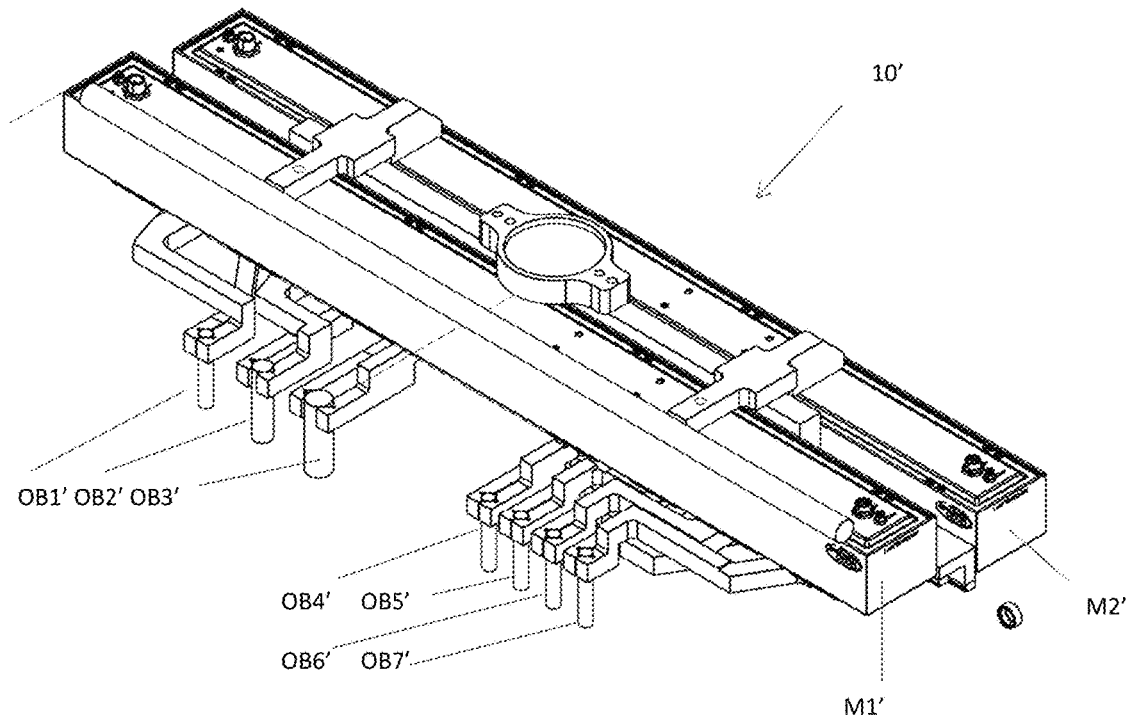
Figure 21C:
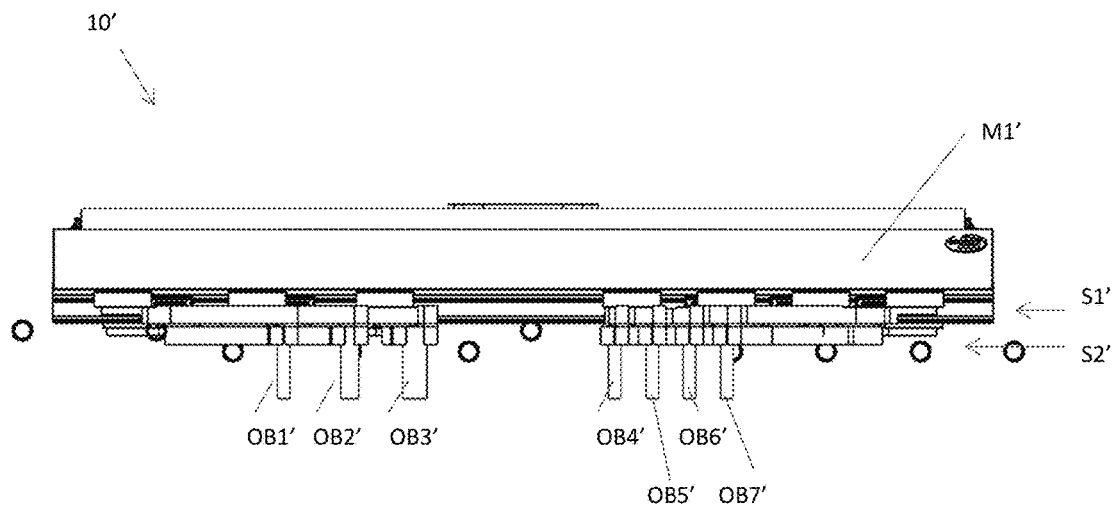
Figure 21D:
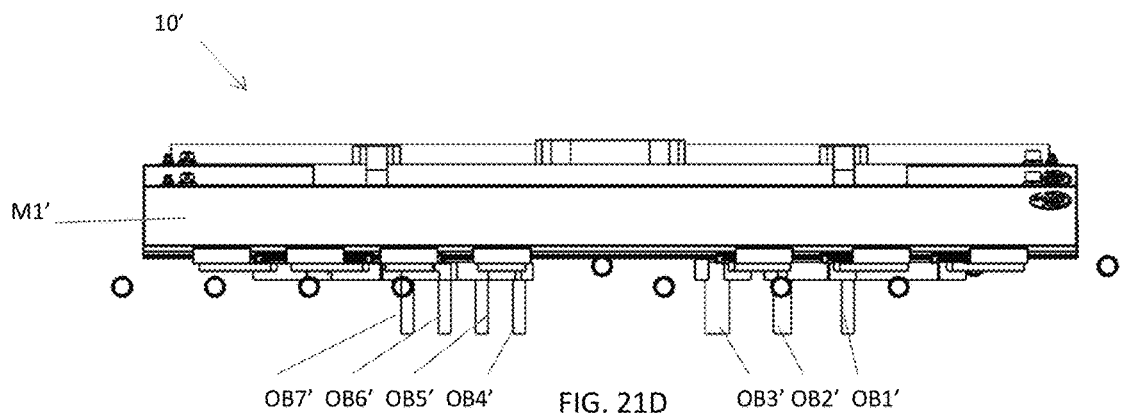
Figure 21E:
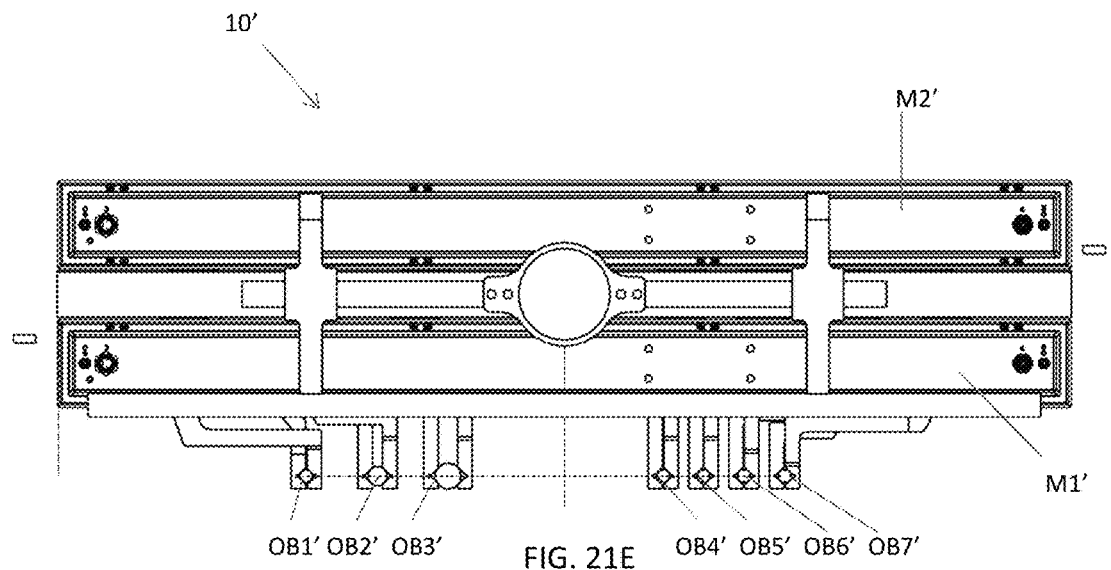
Figure 21F:
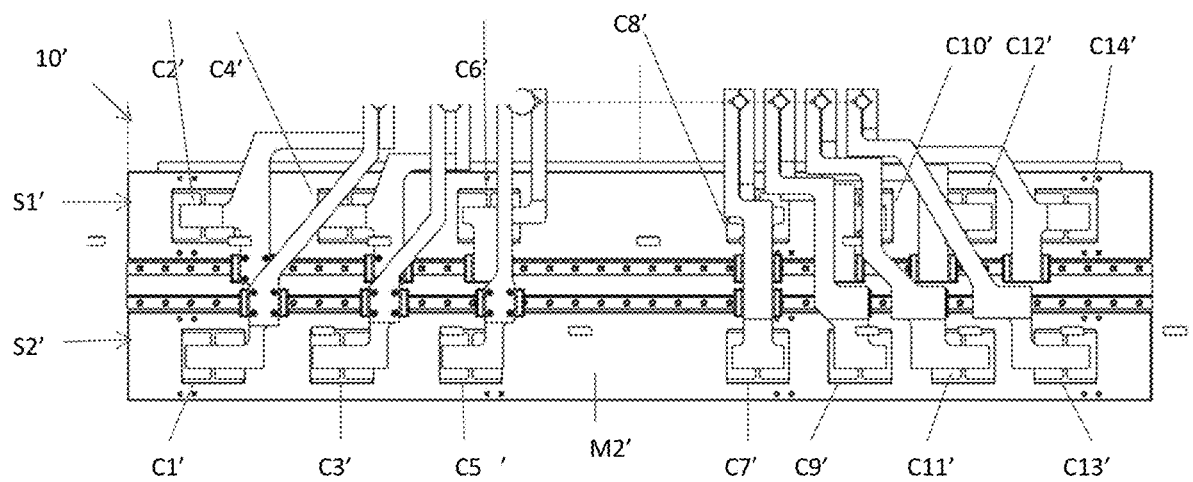
Figure 21G:
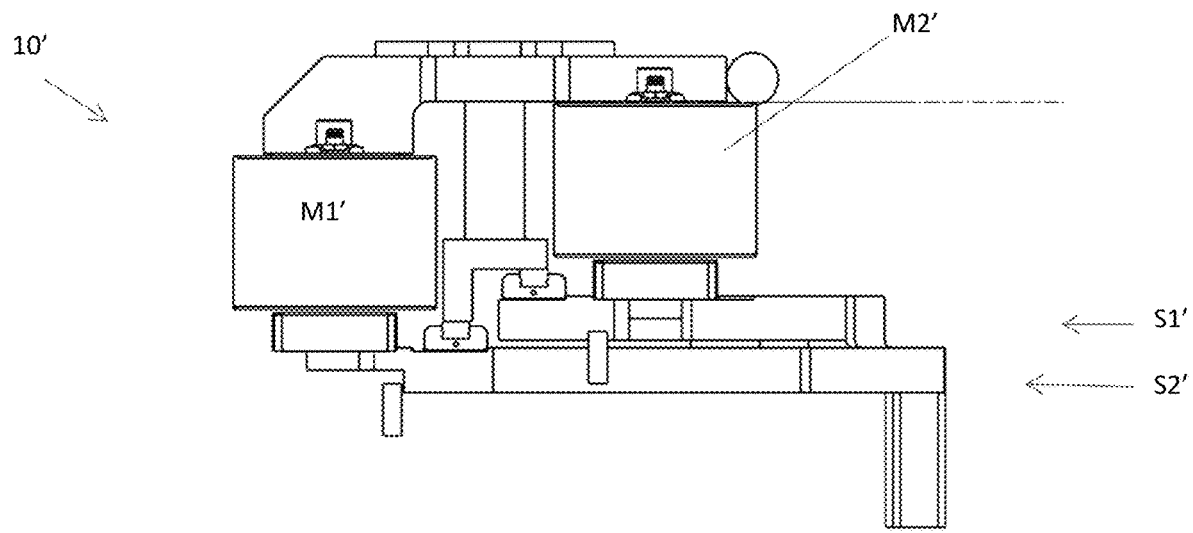
Figure 21H:
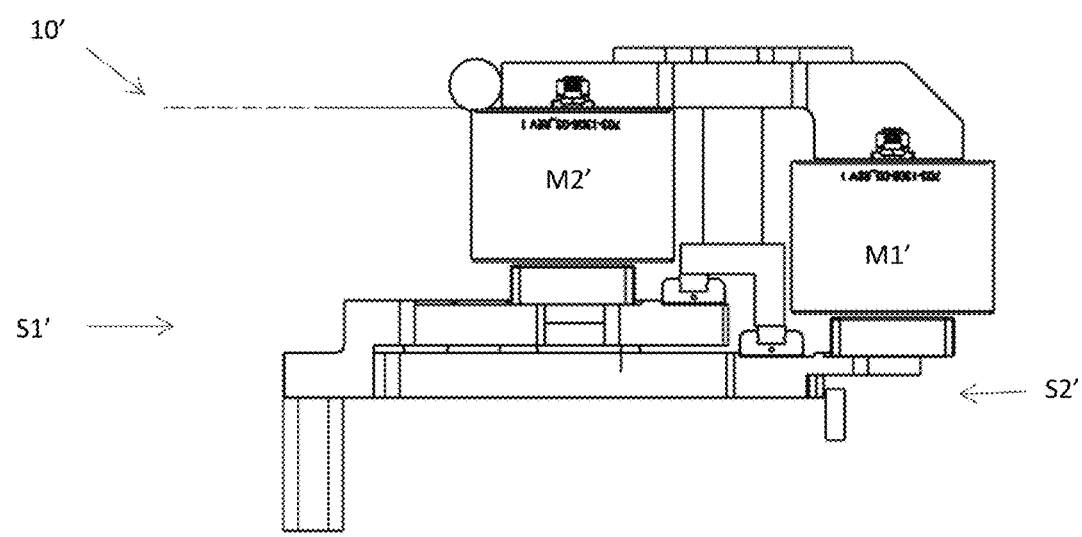

Referring to FIGS. 8 and 10-12 and also particularly FIGS. 16A, 16B and 19, the brackets 50 and 52 attach at the downwardly facing side surface 50c', 52c' of respective bracket middle sections 50c, 52c to the upwardly facing side surface 60a of an elongated center beam 60, the downwardly facing side surface 60b of which connects to upwardly facing surface 40c of right angle member 40 which carries rails $R^1$ and $R_2$ as previously described. A robot connector element 70 is attached to the upwardly facing surface 60a of beam 60 such that EOAT 10 may be attached to the desired robot. The connection between these components may be made using any desired securing means appropriate for the anticipated object handling load weight such as screws, bolts, interference fit, clamps, pins and/or adhesives, for example.

FIGS. 21A-H show another embodiment of picker arms wherein the EOAT 10' is equipped with fourteen individual picking arms $P^{1'}$-$P^{14'}$ which are divided among two picking arm groups or sets $S^{1'}$ and $S^{2'}$ which attach to electromagnetic linear motors $M^{1'}$ and $M^{2'}$, respectively. Similar parts are indicated by the same reference numerals as in the first embodiment with the addition of a prime symbol in the second embodiment. Rather than vacuum picking arms of the first embodiment, this embodiment has picking arms configured for grasping an object such as indicated at OB1'-OB7' between a pair of adjacent picking arms (e.g., OB1' grasped between picking arms OB1' and OB2') and with each adjacent picking arm pair having adjustable pitch spacing.

Electromagnetic linear motors $M^1$ and $M^2$ are each operable to control the movement of the individual carriers $C^1$-$C^{15}$ located in linear spaced relation thereon. Since the picking arms $P^1$$P^{15}$ are each attached to a respective carrier $C^1$-$C^{15}$, movement of a carrier $C^1$-$C^{15}$ causes movement of the respective picking arm $P^1$-$P^{15}$ attached thereto. The carriers $C^1$-$C^{15}$ are individually moveable in a reciprocating manner along their respective linear motors $M^1$, $M^2$ to provide the desired pitch between the picking arms $P^1$-$P^{15}$ at one or more locations throughout the EOAT movement. The desired pitch at the pick location 14a and the place location 14b may be programmed according to the requirements of the particular job via a user interface (not shown) of the linear motor controller operably connected to the linear motors $M^1$ and $M^2$.

There is thus provided a novel linear motor based gripper offering near infinite pitching capability to various robots/slides or fixed mount applications.

From the foregoing, it will be seen that this invention is one well adapted to attain all the ends and objects hereinabove set forth together with other advantages which are obvious and which are inherent to the system and method. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. Apparatus for picking and placing a plurality of objects arranged in a first array from a first pick location to a second place location where the objects are placed in a second array different from said first array, said apparatus comprising:

a) a plurality of a first group of spaced picking arms each having a proximal end and a distal end, each of said distal ends configured to receive a respective vacuum picker;

b) a plurality of a second group of spaced picking arms each having a proximal end and a distal end, each of said distal ends of said second group of picking arms configured to receive a respective vacuum picker, said second group of picking arms positioned with said first group of picking arms such that said distal ends of said first and second groups of picking arms alternate along a longitudinal axis;

c) first and second electromagnetic linear motors each having a plurality of longitudinally spaced carrier elements attached to and individually movable by and along a respective said electromagnetic linear motor;

wherein said proximal ends of each of said first and second groups of picking arms are attached to and movable with a respective one of said carrier elements.

2. The apparatus of claim 1, wherein said first electromagnetic linear motor is operable to adjust the spacing between each of said first group of picking arms.

3. The apparatus of claim 2, wherein said second electromagnetic linear motor is operable to adjust the spacing between each of said second group of picking arms.

4. The apparatus of claim 1, wherein said second electromagnetic linear motor is operable to adjust the spacing between each of said second group of picking arms.

* * * * *